(12) United States Patent
Kandavanam et al.

(10) Patent No.: US 11,176,576 B2
(45) Date of Patent: *Nov. 16, 2021

(54) MOBILE VISUAL LOCATOR

(71) Applicant: Groupon, Inc., Chicago, IL (US)

(72) Inventors: Gajaruban Kandavanam, Chicago, IL (US); Sarika Oak, Chicago, IL (US); Gloria Ye, Chicago, IL (US); Chunjun Chen, Chicago, IL (US)

(73) Assignee: GROUPON, INC., Chicago, IL (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/439,073

(22) Filed: Jun. 12, 2019

(65) Prior Publication Data

US 2020/0034883 A1    Jan. 30, 2020

Related U.S. Application Data

(63) Continuation of application No. 14/749,348, filed on Jun. 24, 2015, now Pat. No. 10,373,204.

(51) Int. Cl.
*G06Q 30/02* (2012.01)
*G06K 9/32* (2006.01)
*G06K 9/62* (2006.01)
*G06K 9/00* (2006.01)

(52) U.S. Cl.
CPC ..... *G06Q 30/0261* (2013.01); *G06K 9/00664* (2013.01); *G06K 9/325* (2013.01); *G06K 9/3208* (2013.01); *G06K 9/6215* (2013.01); *G06Q 30/0259* (2013.01); *G06Q 30/0267* (2013.01)

(58) Field of Classification Search
None
See application file for complete search history.

(56) References Cited

U.S. PATENT DOCUMENTS

| | | | |
|---|---|---|---|
| 2013/0223744 A1* | 8/2013 | Ramanujapuram | G06F 16/583 382/182 |
| 2014/0172570 A1* | 6/2014 | y Arcas | H04W 4/029 705/14.58 |
| 2014/0172681 A1 | 6/2014 | Lamp et al. | |
| 2014/0207748 A1* | 7/2014 | Sood | G06F 16/9537 707/706 |
| 2017/0270582 A1* | 9/2017 | Forss | G06K 9/6273 |

* cited by examiner

*Primary Examiner* — Sam Refai
(74) *Attorney, Agent, or Firm* — Alston & Bird LLP

(57) ABSTRACT

Techniques for providing remote messages to mobile devices based on image data and other sensor data are discussed herein. Some embodiments may include one or more servers configured to: receive, from a consumer device via a network, location data indicating a consumer device location of a consumer device; receive, from the consumer device via the network, image data captured by a camera of the consumer device; receive, from the consumer device via the network, orientation data defining an orientation of the camera when the image data was captured, wherein the orientation data is captured by an accelerometer of the consumer device; attempt to extract a merchant identifier from the image based on programmatically processing the image data; determine one or more merchants based on a fuzzy search of available ones of the location data, the merchant identifier, and the orientation data.

12 Claims, 8 Drawing Sheets

800

802

Pizza Studio
300 S California Ave Palo Alto, 94306    81%

Deals

Oops, we don't have a running deal now.
Stay Tuned!

804

Related Deals

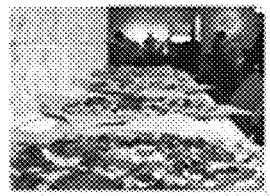
50% Off at Pizza House
Pizza House
Palo Alto (0.5 miles)

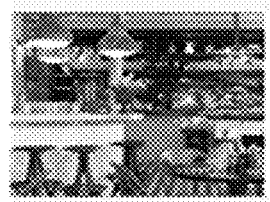
Italian Lunch for One or Two at Spaghetti Basil (Up to 54% Off)
Spaghetti Basil
Palo Alto (2.5 miles)

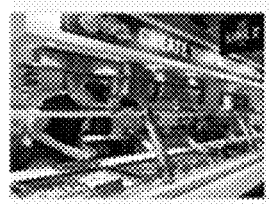
40% off at Italian Pizza Bar for One or Two
Italian Pizza Bar
Palo Alto (6.8 miles)

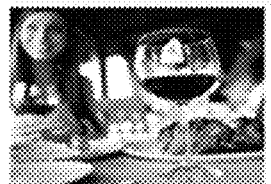
40% off at at Italian Spaghetti Restaurant
Italian Spaghetti Restaurant
Palo Alto (7.1 miles)

Load more options

FIG. 8

MOBILE VISUAL LOCATOR

CROSS REFERENCE TO RELATED APPLICATIONS

The present application is a continuation of U.S. application Ser. No. 14/749,348, filed Jun. 24, 2015, titled "Mobile Visual Locator", the contents of each of which are hereby incorporated by reference in their entirety.

FIELD

Embodiments of the invention relate, generally, to techniques for providing messages based on programmatic optical recognition.

BACKGROUND

Promotional systems provide promotions associated with merchants to consumer devices through various electronic communication channels such as email, application alert, webpage, text message, among other things. The effectiveness of promotional offers can depend on factors such as the relevance of the offers to the locations of the consumer, or the redemption locations of the promotional offers relative to a consumer's travel path (e.g., between a start location and an end location). Some techniques for location determination include global positioning systems (GPS) or cell tower triangulation. However, such techniques have limited accuracy and precision, and may not be suitable for all commercial environments (e.g., inside a building with poor wireless reception). In this regard and others as discussed herein, areas for improving current techniques have been identified.

BRIEF SUMMARY

Through applied effort, ingenuity, and innovation, solutions to improve such systems have been realized and are described herein.

Various embodiments of the present invention are directed to improved apparatuses, methods, and computer readable media for providing remote messages to mobile devices based on image data and other sensor data. Some embodiments may include system, comprising: one or more servers configured to: receive, from a consumer device via a network, location data indicating a consumer device location of a consumer device; receive, from the consumer device via the network, image data captured by a camera of the consumer device; receive, from the consumer device via the network, orientation data defining an orientation of the camera when the image data was captured, wherein the orientation data is captured by an accelerometer of the consumer device; attempt to extract a merchant identifier from the image based on programmatically processing the image data; determine one or more merchants based on a fuzzy search of available ones of the location data, the merchant identifier, and the orientation data; determine whether the one or more merchants returned by the fuzzy search includes multiple merchants; in response to determining that the one or more merchants includes multiple merchants: send an indication of the multiple merchants to the consumer device via the network; receive a selection of a first merchant of the multiple merchants from the consumer device; determine the first merchant as a selected merchant; and provide an electronic marketing communication associated with the selected merchant to consumer device.

In some embodiments, the one or more servers may be further configured to, subsequent to determining the first merchant as the selected merchant, associate the first merchant with the available ones of the location data, the merchant identifier, and the orientation data for one or more subsequent fuzzy searches.

In some embodiments, the one or more servers may be further configured to, in response to determining that the one or more merchants includes a single merchant: determine the single merchant as a second selected merchant; and provide a second electronic marketing communication associated with the second selected merchant to consumer device.

In some embodiments, the one or more servers may be further configured to, in response to determining that the one or more merchants includes the single merchant: send a merchant confirmation request to the consumer device via the network; and confirm the single merchant as the second selected merchant based on receiving a response to the merchant confirmation request from the consumer device via the network.

In some embodiments, the one or more servers may be further configured to: determine, based on accessing promotion data associated with the selected merchant, whether the selected merchant is associated with an available promotion; and in response to determining that the selected merchant is associated with the available promotion, generate the electronic marketing communication including an indication of the available promotion.

In some embodiments, the one or more servers may be further configured to: determine, based on accessing promotion data associated with the selected merchant, whether the selected merchant is associated with an available promotion; and in response to determining that the selected merchant fails to be associated with an available promotion: determine merchant parameters associated with the selected merchant; determine, based on the merchant parameters and promotion parameters defining candidate promotions, one or more promotions associated with merchants that are different from the selected merchant and related to the selected merchant; and generate the electronic marketing communication including an indication of at least one of the one or more promotions.

In some embodiments, the one or more servers may be further configured to, subsequent to determining the first merchant as the selected merchant: determine, based on accessing promotion data associated with the selected merchant, whether the selected merchant is associated with an available promotion; and in response to determining that the selected merchant fails to be associated with an available promotion: determine merchant parameters associated with the selected merchant; determine, based on the merchant parameters and promotion parameters defining candidate promotions, one or more promotions associated with merchants that are different from the selected merchant and related to the selected merchant; and generate the electronic marketing communication including an indication of at least one of the one or more promotions.

In some embodiments, the one or more servers configured to determine one or more merchants based on the fuzzy search of the location data and available ones of the merchant identifier and the orientation data may include the one or more servers being configured to: access merchant location data defining merchant locations; and compare the merchant location data with the location data indicating the consumer device location.

In some embodiments, the one or more servers configured to determine one or more merchants based on the fuzzy search of the location data and available ones of the merchant identifier and the orientation data may include the one or more servers being configured to: access merchant identifier data defining merchant identifiers; and compare the merchant identifiers defined by the merchant identifier data with the merchant identifier extracted from the image.

In some embodiments, the one or more servers configured to determine one or more merchants based on the fuzzy search of the available ones of the location data, the merchant identifier, and the orientation data may include the one or more servers being configured to: access merchant orientation data defining orientations of cameras associated with image data of the one or more merchants; and compare the orientations of cameras associated with the image data of the one or more merchants with orientation of the camera when the image data was captured by the consumer device.

In some embodiments, the one or more servers configured to attempt to extract the merchant identifier from the image based on programmatically processing the image data may include the one or more servers configured to: extract an object from the image data; and determine the merchant identifier based on the object.

Some embodiments may include a method, comprising: receiving, by one or more servers and from a consumer device via a network, location data indicating a consumer device location of a consumer device; receiving, from the consumer device via the network, image data captured by a camera of the consumer device; receiving, from the consumer device via the network, orientation data defining an orientation of the camera when the image data was captured, wherein the orientation data is captured by an accelerometer of the consumer device; attempting to extract a merchant identifier from the image based on programmatically processing the image data; determining one or more merchants based on a fuzzy search of available ones of the location data, the merchant identifier, and the orientation data; determining whether the one or more merchants returned by the fuzzy search includes multiple merchants; in response to determining that the one or more merchants includes multiple merchants: sending an indication of the multiple merchants to the consumer device via the network; receiving a selection of a first merchant of the multiple merchants from the consumer device; determining the first merchant as a selected merchant; and providing an electronic marketing communication associated with the selected merchant to consumer device.

In some embodiments, the method may further include, by the one or more servers and subsequent to determining the first merchant as the selected merchant, associating the first merchant with the available ones of the location data, the merchant identifier, and the orientation data for one or more subsequent fuzzy searches.

In some embodiments, the method may further include, by the one or more servers and in response to determining that the one or more merchants includes a single merchant: determining the single merchant as a second selected merchant; and providing a second electronic marketing communication associated with the second selected merchant to consumer device.

In some embodiments, the method may further include, by the one or more servers and in response to determining that the one or more merchants includes the single merchant: sending a merchant confirmation request to the consumer device via the network; and confirming the single merchant as the second selected merchant based on receiving a response to the merchant confirmation request from the consumer device via the network.

In some embodiments, the method may further include, by the one or more servers: determining, based on accessing promotion data associated with the selected merchant, whether the selected merchant is associated with an available promotion; and in response to determining that the selected merchant is associated with the available promotion, generating the electronic marketing communication including an indication of the available promotion.

In some embodiments, the method may further include, by the one or more servers: determining, based on accessing promotion data associated with the selected merchant, whether the selected merchant is associated with an available promotion; and in response to determining that the selected merchant fails to be associated with an available promotion: determining merchant parameters associated with the selected merchant; determining, based on the merchant parameters and promotion parameters defining candidate promotions, one or more promotions associated with merchants that are different from the selected merchant and related to the selected merchant; and generating the electronic marketing communication including an indication of at least one of the one or more promotions.

In some embodiments, the method may further include, by the one or more servers and subsequent to determining the first merchant as the selected merchant: determining, based on accessing promotion data associated with the selected merchant, whether the selected merchant is associated with an available promotion; and in response to determining that the selected merchant fails to be associated with an available promotion: determining merchant parameters associated with the selected merchant; determining, based on the merchant parameters and promotion parameters defining candidate promotions, one or more promotions associated with merchants that are different from the selected merchant and related to the selected merchant; and generating the electronic marketing communication including an indication of at least one of the one or more promotions.

In some embodiments, determining the one or more merchants based on the fuzzy search of the available ones of the location data, the merchant identifier, and the orientation data may include: accessing merchant location data defining merchant locations; and comparing the merchant location data with the location data indicating the consumer device location.

In some embodiments, determining the one or more merchants based on the fuzzy search of the available ones of the location data, the merchant identifier, and the orientation data may include: accessing merchant identifier data defining merchant identifiers; and comparing the merchant identifiers defined by the merchant identifier data with the merchant identifier extracted from the image.

In some embodiments, determining the one or more merchants based on the fuzzy search of the available ones of the location data, the merchant identifier, and the orientation data may include: accessing merchant orientation data defining orientations of cameras associated with image data of the one or more merchants; and comparing the orientations of cameras associated with the image data of the one or more merchants with orientation of the camera when the image data was captured by the consumer device.

In some embodiments, attempting to extract the merchant identifier from the image based on programmatically processing the image data may include: extracting an object from the image data; and determining the merchant identifier based on the object.

Some embodiments may include methods, while other embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
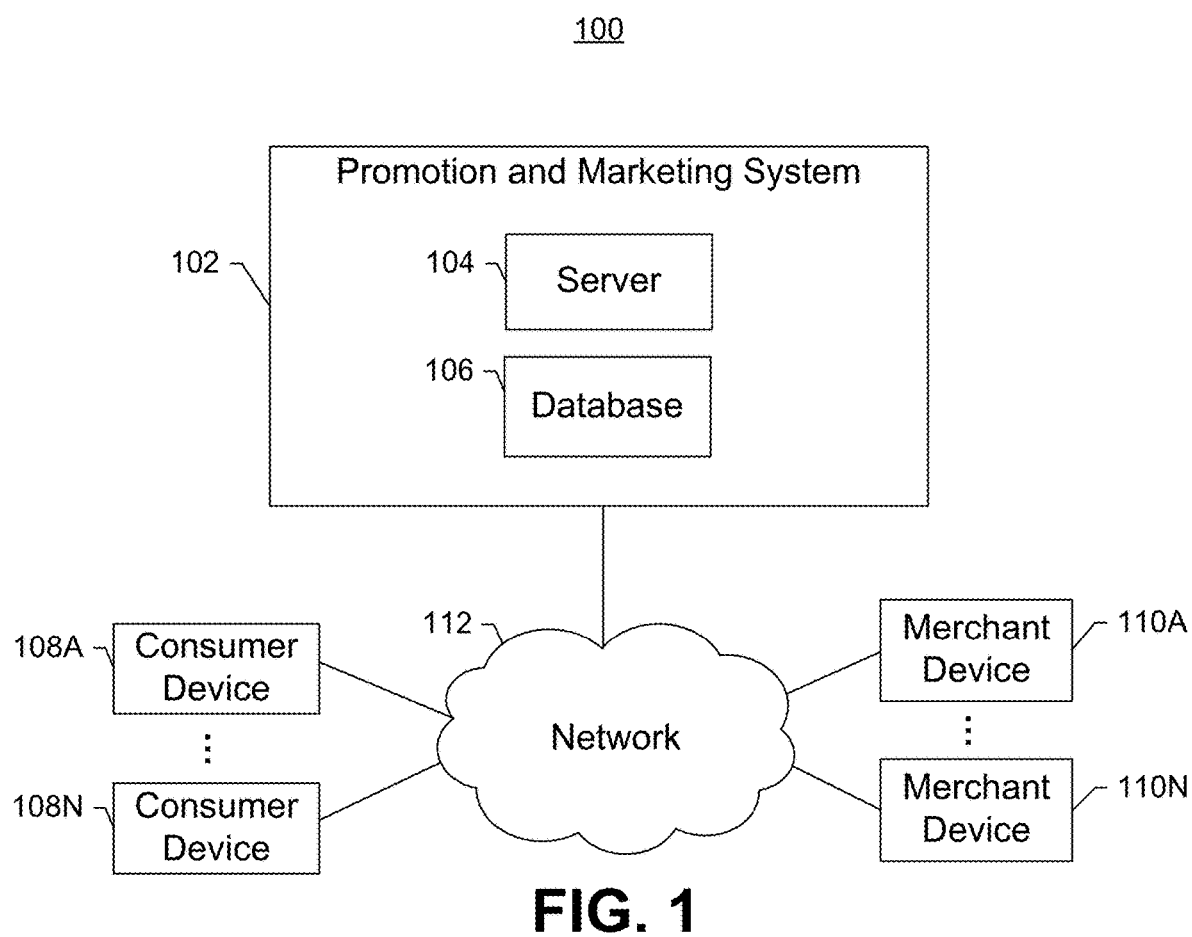
Figure 2:
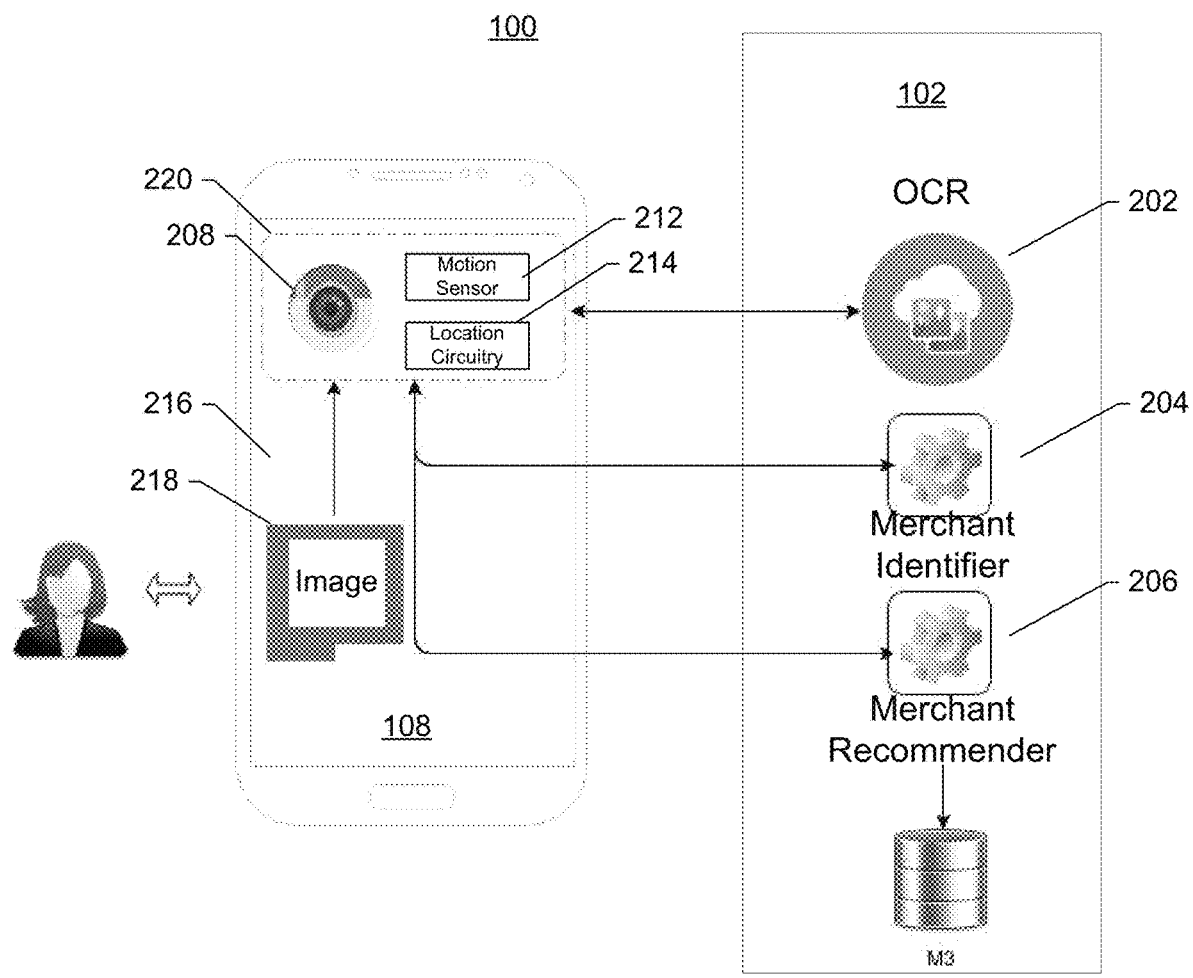
Figure 3:
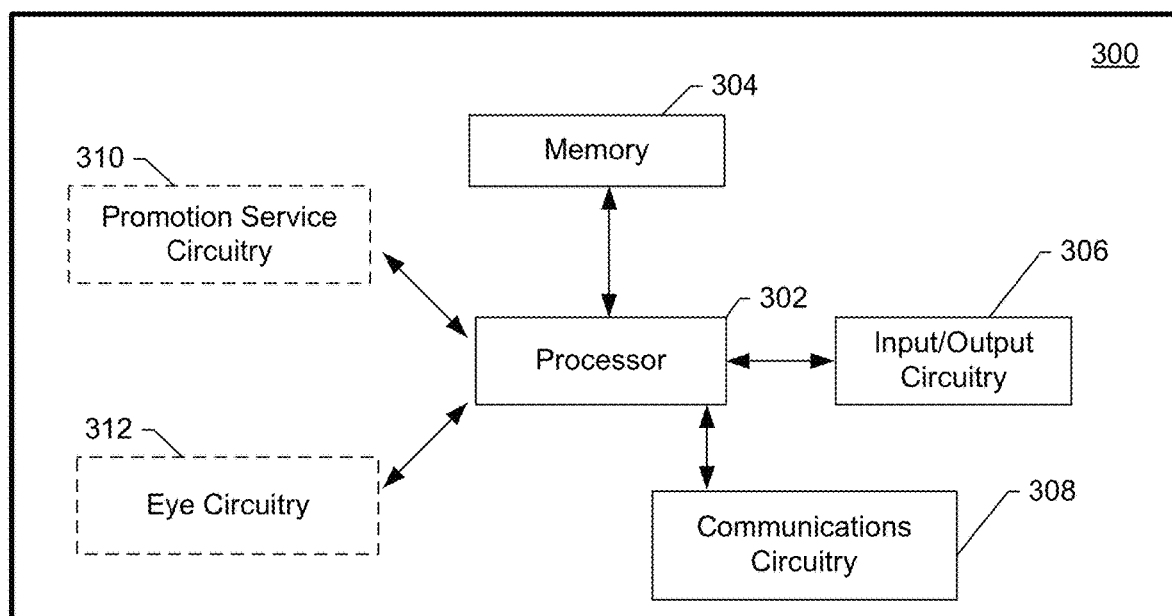
Figure 4:
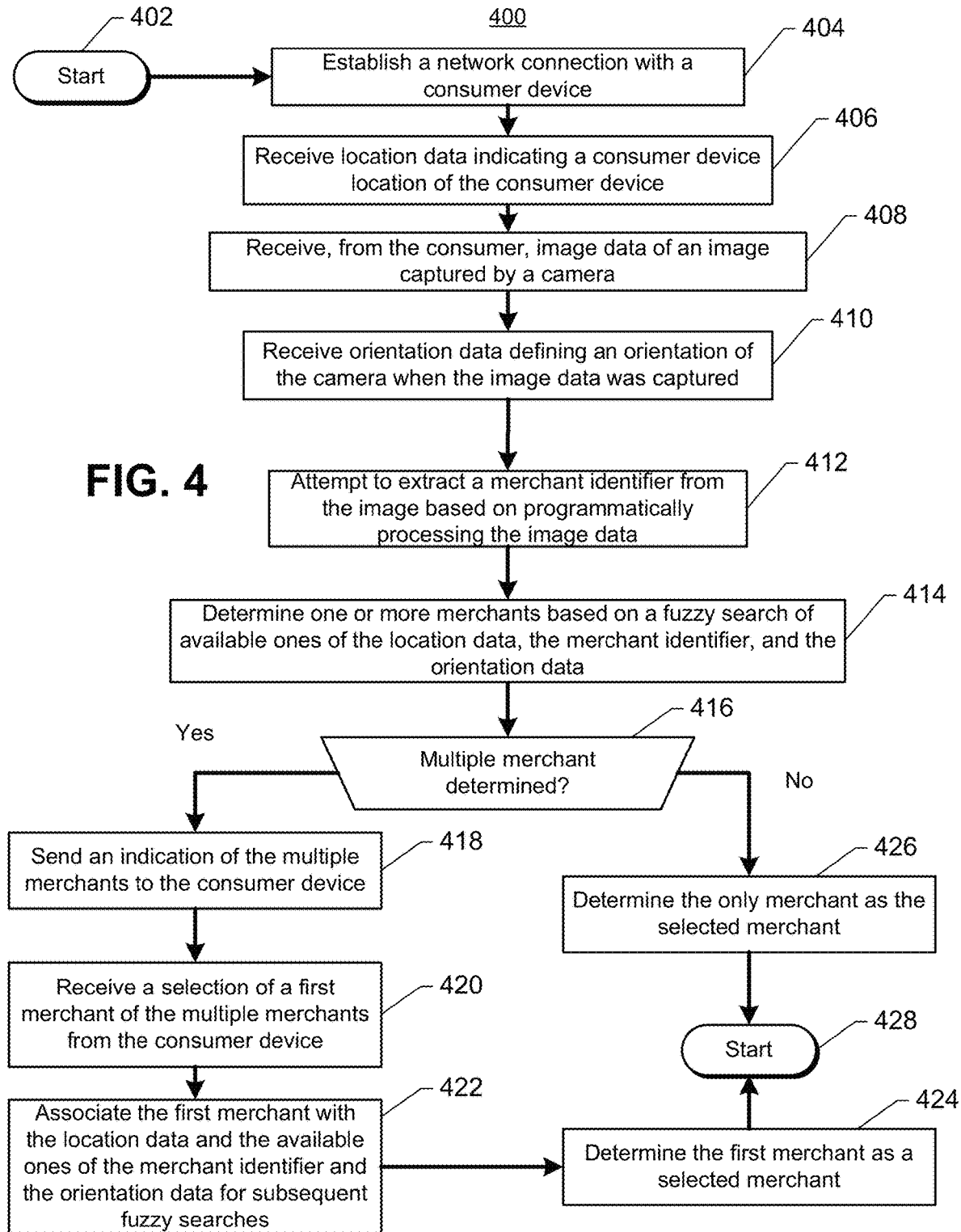

Having thus described some embodiments in general terms, reference will now be made to the accompanying drawings, which are not necessarily drawn to scale, and wherein:

FIG. 1 shows an example of a system in accordance with some embodiments;

FIG. 2 shows an example of a system in accordance with some embodiments;

FIG. 3 shows a schematic block diagram of example circuitry in accordance with some embodiments;

FIG. 4 shows a flow chart of an example of a method for providing an electronic message to a mobile device based on image data in accordance with some embodiments.

Figure 5:
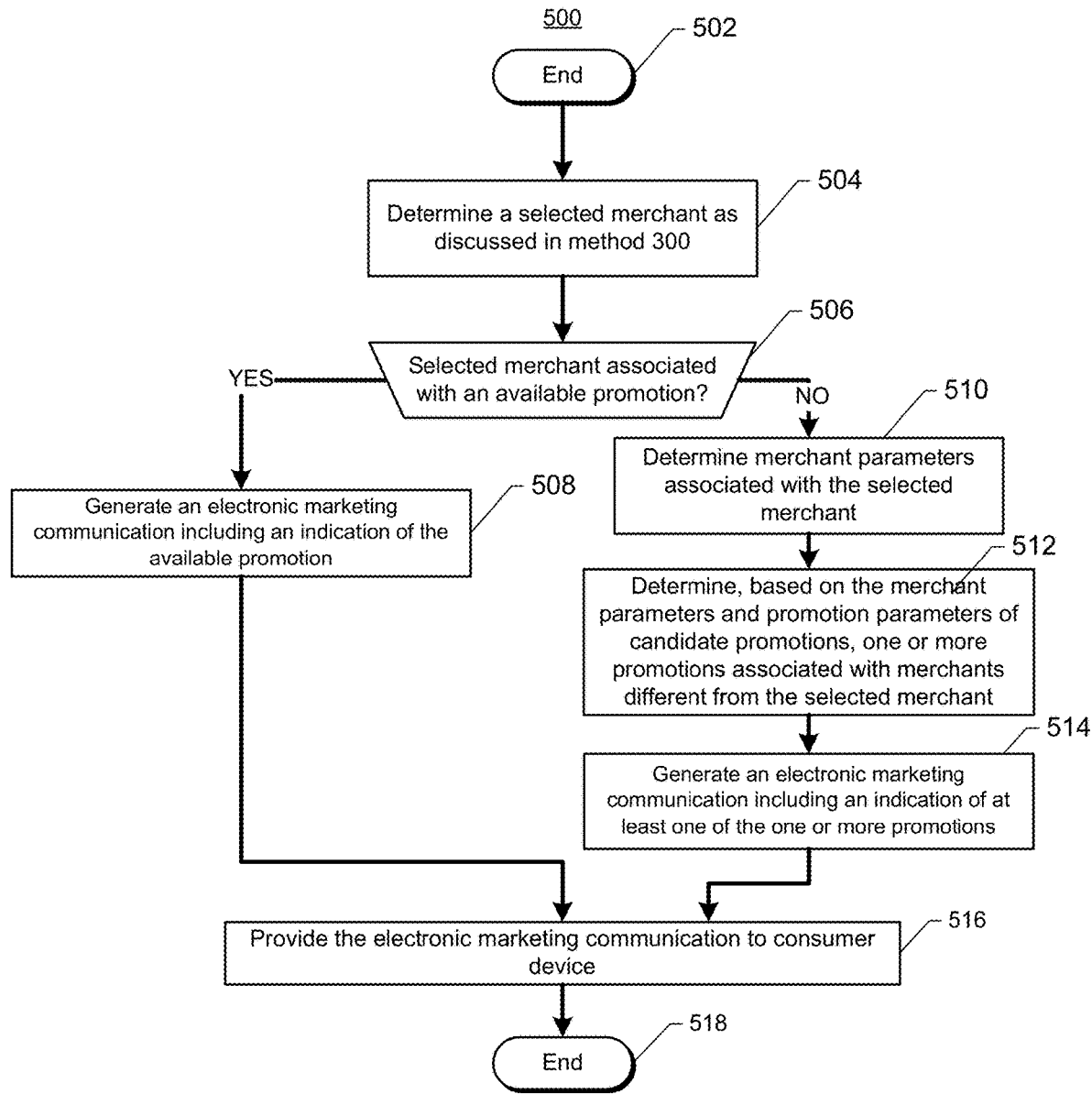
Figure 6:
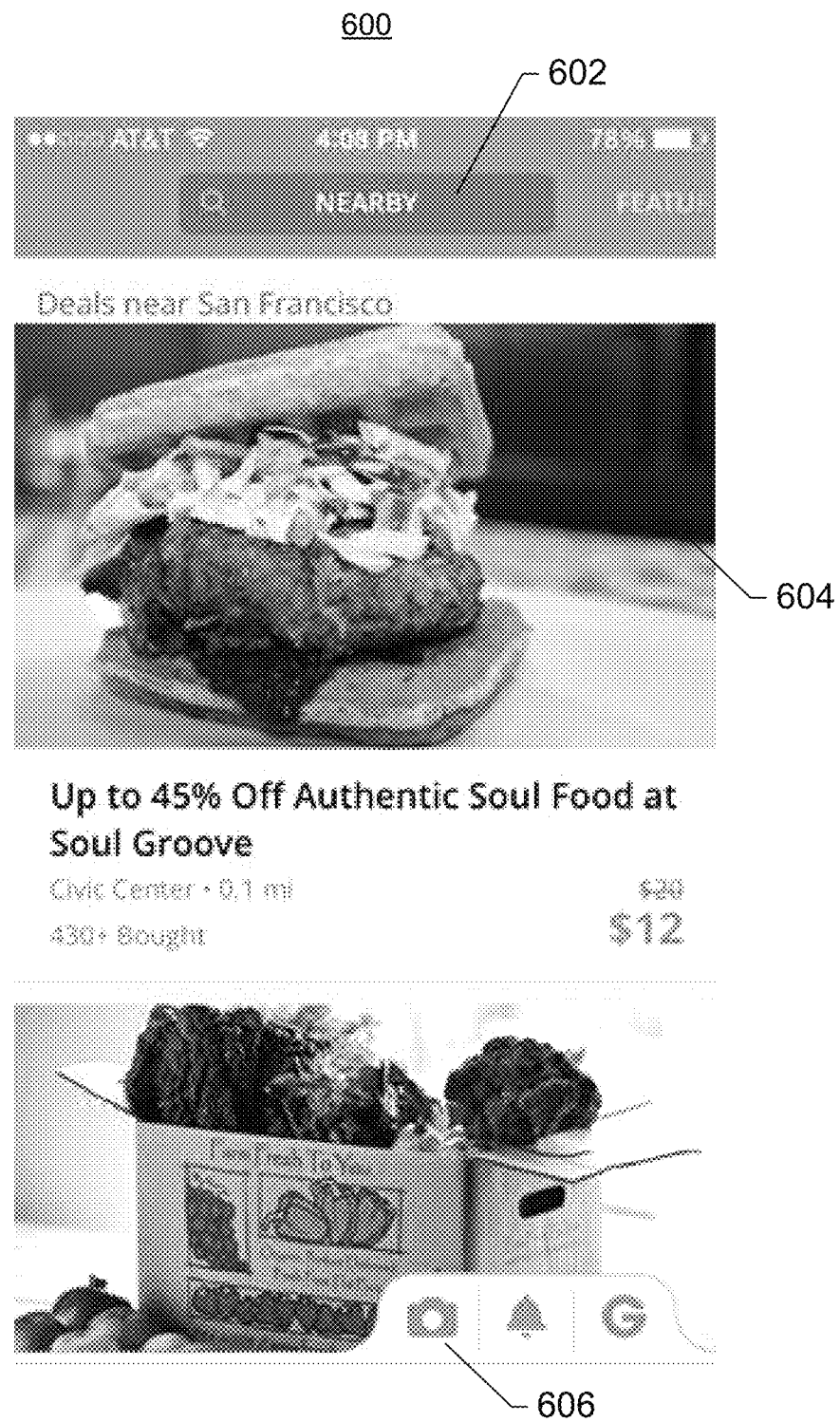

FIG. 5 shows an example of a method of providing an electronic marketing communication based on a selected merchant in accordance with some embodiments;

FIG. 6 shows an example of a consumer interface in accordance with some embodiments.

Figure 7:
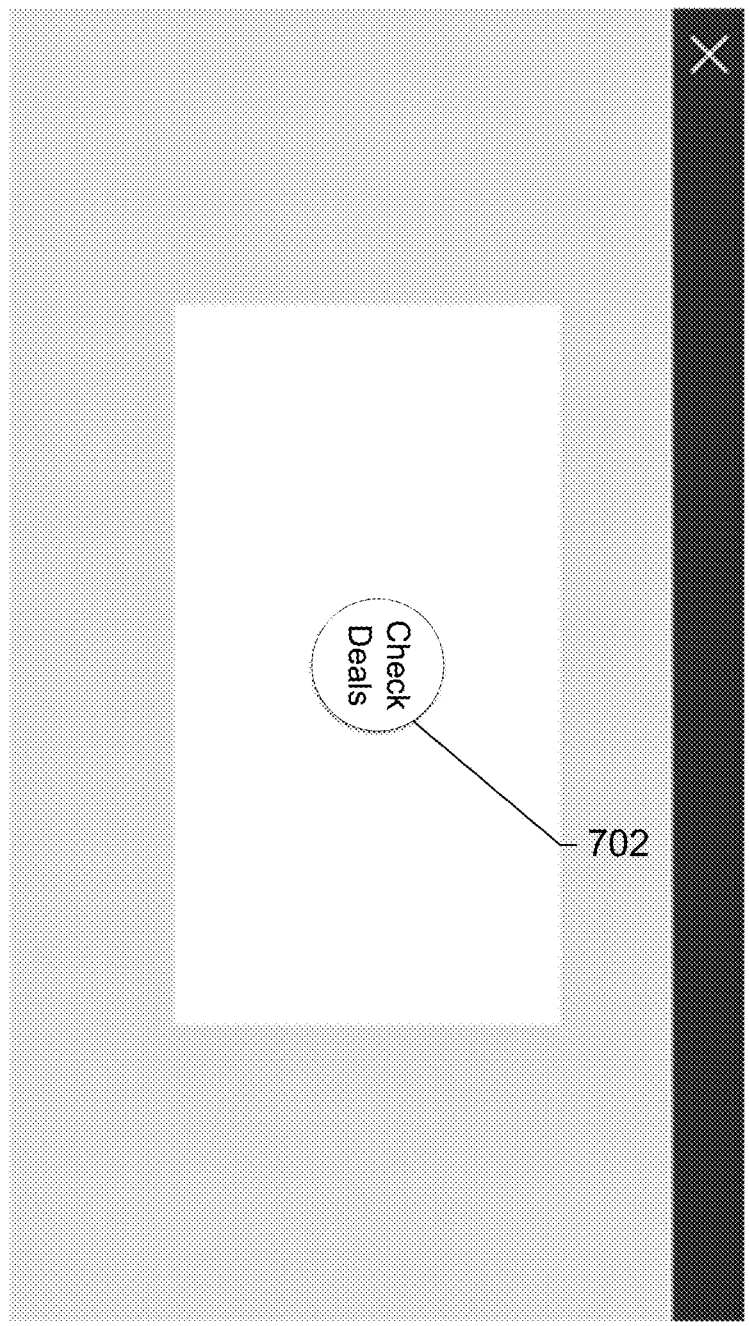

FIG. 7 shows an example of a camera interface in accordance with some embodiments; and FIG. 8 shows an example of an electronic marketing communication in accordance with some embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" or "promotion service" may include a service that is accessible via one or more computing devices and that is operable to provide promotion and/or marketing services on behalf of one or more providers that are offering one or more instruments that are redeemable for goods, services, experiences and/or the like. The promotion and marketing service may be provided by a promotion and marketing system. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. The parameters of a promotion may be defined by promotion data. In some embodiments, the promotion data may define one or more redemption locations for a promotion, such as a merchant shop, restaurant, retail shop, etc.

Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), (e.g., consumer device) location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, and/or presence-based wireless detection (e.g., where the consumer device is detected upon entering a communicable range of a detecting device, such as a beacon or merchant device located at a merchant shop/redemption location) such as personal area networks (PAN) (e.g., using WiFi, Bluetooth, etc.), infrared or other visual sensors, and/or radio frequency identification (RFID) location systems.

As used herein, the term "image data" refers to data captured by a camera or other optical image capture device. The camera may be located on a consumer device, and thus images captured by the camera may indicate consumer device location.

As used herein, the term "orientation data" refers to data captured by a motion sensor, such as an accelerometer and/or gyroscope. The orientation data may define an orientation of the consumer device, and thus a camera or other image capturing device of the consumer device. In some embodiments, orientation data may be captured by a motion sensor concurrently with image data being captured with a camera. The orientation data, location data, and image data may be used to provide fine grain location determination and merchant shop identification, as discussed in greater detail herein.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) text message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 shows an example computing system within which embodiments of the present invention may operate. Consumers and merchants may access a promotion and marketing service from a promotion and marketing system 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing system 102 may comprise a server 104 and a database 106.

The server 104 may be embodied as a single computer or multiple computers. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic marketing communications based on the received electronic data (e.g., historical promotion data, electronic marketing data, etc.). In some embodiments, the server 104 may be configured to provide electronic marketing communications based on identifying consumer device location. As discussed in greater detail herein, location data defining consumer device location, image data captured by a camera of the consumer device, and/or orientation data captured by a motion sensor of the consumer may be received by the server 104. The server 104 may perform a fuzzy search for merchants (e.g., merchant shop locations) based on the available location data, image data, and/or orientation data. The best matching merchant result(s) may then be used to determine a selected merchant, and an electronic marketing communication associated with the merchant may be provided to the consumer device 108. In some embodiments, where the fuzzy search does not return a single merchant or when there is otherwise insufficient certainty of a match, the consumer device 108 may be prompted to select the merchant. The server 104 may then use the consumer device selection for machine learning and refinement of subsequent fuzzy searches. Although a single server 104 is shown, system 102 may include one or more servers 104. In some embodiments, the one or more servers 104 may include promotion service circuitry 210 and/or map circuitry 212, as shown in FIG. 2.

Returning to FIG. 1, database 106 may be embodied as a data storage device such as a Network Attached Storage (NAS) device or devices, or as a separate database server or servers. The database 106 includes information accessed and stored by the server 104 to facilitate the operations of the promotion and marketing system 102. For example, the database 106 may include, without limitation, promotion data, user account credentials for system administrators, merchant locations, and consumers, promotion data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. The consumer devices 108A-108N may include mobile devices, such as laptop computers, smartphones, netbooks, tablet computers, wearable devices (e.g., electronic watches, wrist bands, glasses, etc.), and the like. Such mobile devices may provide their location data, image data, and/or orientation data to the server 104 and receive targeted electronic marketing communications that are relevant to the sent data. As such, consumer device 108 may include a camera, motion sensor, and location circuitry (e.g., GPS receivers, antennas, etc.). In some embodiments, the consumer devices 108A-108N may include wired or stationary devices such as desktop computers or workstations. For example, various functionalities described herein with respect to a consumer device may be performed on a desktop consumer device (e.g., consumer account registration, interaction with electronic marketing communications, creation of clickstream data, etc.), while other (e.g., wireless mobile-based) functionalities may be performed on a mobile consumer device.

In embodiments where a consumer device 108 is a mobile device, such as a smart phone or tablet, the consumer device 108 may execute an "app" or "consumer application" to interact with the promotion and marketing system 102, such as a trip planning/guidance application. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing system 102 may leverage the application framework offered by the mobile operating system to allow consumers to designate which information is provided to the app and which may then be provided to the promotion and marketing system 102. In some embodiments, consumers may "opt in" to provide particular data to the promotion and marketing system 102 in exchange for a benefit, such as improved relevancy of marketing communications offered to the user. In some embodiments, the consumer may be provided with privacy information and other terms and conditions related to the information provided to the promotion and marketing system 102 during installation or use of the app. Once the consumer provides access to a particular feature of the mobile device, information derived from that feature may be provided to the promotion and marketing system 102 to improve the quality of the consumer's interactions with the promotion and marketing service.

For example, the consumer may indicate that they wish to provide location information to the app from location services circuitry included in their mobile device. Providing this information to the promotion and marketing system 102 may enable the promotion and marketing system 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing system 102. For example, the consumer may decide at a later point to disable the ability of the app to access the location services circuitry, thus limiting the access of the consumer's location information to the promotion and marketing system 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing system 102 via a web browser. As yet another example, the consumer device 108 may include various hardware or firmware designed to interface with the promotion and marketing system 102 (e.g., where the consumer device 108 is a purpose-built device offered for the primary purpose of communicating with the promotion and marketing system 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing system 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing system 102 to enable the promotion and marketing system 102 to generate promotions or other marketing information to be provided to consumers.

FIG. 2 shows an example of a system 100 in accordance with some embodiments. In particular, FIG. 2 shows schematic block diagrams of functional components of the system 100. System 102 may include OCR engine 202, merchant identifier 204, and merchant recommender 206, which may be implemented via the one or more servers 104 and one or more databases 106 in some embodiments. Consumer device 108 may include an eye module 220, including camera 208, motion sensor 212, location circuitry 214, and user input 216 (e.g., a touch screen). The consumer device 108 and system 102 may be connected with each other via the network 112. The ORC module 202 may be configured to receive image 218 captured by camera 208, and extract text from the image data. The merchant identifier module 204 may be configured to receive the extracted text, as well as the location data (e.g., GPS coordinate) from the location circuitry 214 and/or the orientation data from the motion sensor 214. Using the available ones of the location data, extracted text, and orientation data, the merchant identifier module 104 may be configured to perform a fuzzy search for merchants (e.g., merchant shop locations). The best matching merchant result(s) may then be used to determine a selected merchant, and merchant identifier module 204 or other portion of the system 102 may be configured to provide electronic marketing communication associated with the merchant may be provided to the consumer device 108.

In some embodiments, when no promotion or other item is being offered by the selected merchant, merchant recommender module 206 may be configured to determine a related merchant and/or promotion associated with a different merchant. An electronic marketing communication associated with the different merchant may be provided to the consumer device 108. When the fuzzy search does not return a single merchant or when there is otherwise insufficient certainty of a match, the consumer device 108 may be prompted to select the merchant. The merchant identifier module 204 may subsequently use the consumer device selection for machine learning and refinement of subsequent fuzzy searches.

Example Apparatus[es] for Implementing Various Embodiments

The server 104, database 106, consumer device 108 or merchant device 110 may be embodied by one or more computing systems or devices, such as apparatus 300 shown in FIG. 3. As illustrated in FIG. 3, the apparatus 300 may include a processor 302, a memory 304, an input/output circuitry 306, communications circuitry 308, a promotion service circuitry 310, and an eye circuitry 312. The apparatus 300 may be configured to execute the operations described herein. Although these components 302-310 are described with respect to functional limitations, it should be understood that the particular implementations necessarily include the use of particular hardware. It should also be understood that certain of these components 302-310 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 304 may provide storage functionality, the communications circuitry 308 may provide network interface functionality, and the like.

In some embodiments, the processor 302 (and/or co-processor or any other processing circuitry assisting or otherwise associated with the processor) may be in communication with the memory 304 via a bus for passing information among components of the apparatus 300. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments of the present invention.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display and may comprise a web user interface, a mobile application, a client device, a kiosk, or the like. The input/output circuitry 306 may include a camera, motion sensor, and touch screen. In some embodiments, the input/output circuitry 306 may also include a keyboard, a mouse, a joystick, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

When circuitry 300 is implemented on a server 104, circuitry 300 may include promotion service circuitry 310. The promotion service circuitry 310 may include hardware configured to generate and provide electronic marketing communications to consumer devices. In some embodiments, the promotion service circuitry 310 may be configured to provide the functionality discussed herein with respect to generating targeted electronic marketing communications, consumer device location, and merchant identification. For example, one or more of OCR module 202, merchant identifier module 204, and merchant recommender module 206 may be implemented via the promotion service circuitry 310.

When circuitry 300 is implemented on a consumer device 108, circuitry 300 may include eye circuitry 312. The eye circuitry 312 may include hardware configured to generate and provide electronic marketing communications to consumer devices. In some embodiments, the eye circuitry 312 may be configured to provide the functionality discussed herein with respect to generating interacting with the promotion service circuitry 310, such as providing one or more of image data, location data, and orientation data. For example, eye module 220 may be implemented via the eye circuitry 312.

Circuitries 310 and 312 may utilize processing circuitry, such as the processor 302, to perform these actions. However, it should also be appreciated that, in some embodiments, circuitries 310 and 312 may include a separate processor, specially configured field programmable gate array (FPGA), or application specific interface circuit (ASIC). Circuitries 310 and 312 may therefore be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium

Mobile Visual Locator

FIG. 4 shows a flow chart of an example of a method 400 for providing an electronic message to a mobile device based on image data in accordance with some embodiments. Method 400 may begin at 402 and proceed to 404, where one or more servers (e.g., server 104 of the promotion and marketing system 102) may establish a network connection with a consumer device. For example, the connection may be established based on the consumer device 108 connecting with the one or more servers 104 of the promotion and marketing system 102 via network 112, as shown in FIG. 1.

In some embodiments, the network connection may be initiated based on consumer device access to a consumer application for providing a consumer interface installed and/or otherwise executing on the consumer device. In another example, the consumer device may access a webpage configured to provide the consumer application/interface, such as by entering a uniform resource locator (URL) within a web browser. The connection between the consumer device 108 and the one or more servers 104 may include a wireless connection such that the consumer device may maintain network connectivity while traveling to different locations. The consumer application may be installed on and/or otherwise executed by the processing circuitry of the consumer device, such as on a mobile device operating system as discussed above.

FIG. 6 shows an example of a home interface 600 in accordance with some embodiments. Home interface 600 may be provided to the consumer interface of the consumer device, such as in response to the consumer selecting a consumer application icon on the mobile operating system home screen or otherwise accessing the consumer application. Home interface 600 may include search input 602 configured to receive search terms for promotion/merchant searches. Electronic marketing communication 604 may include an indication of one or more promotions. The promotions may be programmatically targeted to the consumer, such as based on consumer device location and/or tracking consumer preferences with electronic marketing information. Home interface 600 may further include camera button 606. The camera button 606 may provide a link to initiate the functionality discussed herein with respect to providing image data that is used for fine consumer device location determination and merchant identification.

At 406, the one or more servers may be configured to receive location data indicating a consumer device location of the consumer device. The location data may take the form of coordinates, such as longitude and latitude. The consumer device (e.g., eye module 220 and/or eye circuitry 312) may be configured to obtain the location data using any suitable technique, such as GPS. Additionally or alternatively, cell tower triangulation, near field signals, Bluetooth signals, and/or Wi-Fi signals may be used to determine the location data. The use of cell tower triangulation, Bluetooth, near field, or WiFi signals may consumes less power and result in faster response times compared to the GPS, may also allow for more reliability indoors than GPS. In some embodiments, a native Operating System (OS) location service the mobile phone may be used, such as the Android Network Location® for the Android® operating system, or the Location Services® for the iOS® operating system.

At 408, the one or more servers may be configured to receive, from the consumer, image data of an image captured by a camera. The camera may be an input device of the consumer device configured to generate the image data. FIG. 7 shows an example of a camera interface 700 in accordance with some embodiments. Camera interface 700 may be provided for creation of the image data. In some embodiments, camera interface 700 may be accessed based on consumer device input that selects the camera button 606 of the home interface 600 shown in FIG. 6. The camera interface 700 may include an overlay 702 configured to overlay an image being captured by the camera. The consumer device may further include an image capture button, which may be a physical button or may be a software generated button (e.g., selectable via the touch screen). As such, the consumer device camera may capture the image data, which may be sent to the one or more servers 104 via the network 112.

At 410, the one or more servers may be configured to receive orientation data defining an orientation of the camera when the image data was captured. The orientation data may define the direction that the camera is facing when the image data was captured, and thus consumer device may be configured to capture the orientation data with the motion sensor when the image data is captured. The orientation data may include a coordinate value including x, y, and z axis values, representing a difference between the consumer device orientation to a reference normal orientation. In various embodiments, a three axis accelerometer with and a gyroscope, or a six axis accelerometer, or other motion sensor capable of providing a six degree of freedom inertial system.

At 412, the one or more servers may be configured to attempt to extract a merchant identifier from the image based on programmatically processing the image data. For example, the merchant identifier may be a merchant name. The consumer device may capture image data that includes the merchant name, such as by pointing the camera at a sign disposed at the merchant location.

For example, a merchant's sign may be captured and the image data may be provided to an Optical Character Recognition (OCR) engine 202. The ORC engine 202 may then extract text (e.g., a merchant name) out of the image using an OCR library, and return the extracted text. If the OCR engine 202 fails to recognize the texts in the image, then the response will not include the merchant name. Here, the merchant identifier may be ignored as discussed below. It may not be always possible to extract the merchant name (or other merchant identifier) from the texts recognized. In some embodiments, the extracted text may be supplied and used as the merchant identifier (e.g., without any attempt to match the extracted text to a predefined words or library terms).

In some embodiments, a merchant identifier may be different from a merchant name. For example, the one or more servers may be configured to extract an object from the image data, and determine the merchant identifier based on the object. For example, a merchant identifier may include the structure of a storefront, a logo, a menu, or some other portion of the merchant shop.

At 414, the one or more servers may be configured to determine one or more merchants based on a fuzzy search of the available ones of the location data, the merchant identifier, and the orientation data. For example, subsequent to the merchant identifier, coordinates and the orientation (or a subset of them) being generated, the eye module 220 may query the merchant locator identifier module 204 to determine whether the merchant captured in the image data is offering a promotion. The merchant identifier module 204 may be configured to perform a fuzzy search to find the merchant with the provided information. A fuzzy search, as used herein, refers to a search that attempts to match a pattern approximately when an exact match is unavailable. For example, an edit distance or the like may be determined for each candidate merchant based on the available location data, merchant identifier, and/or orientation data. Then the edit distances of the candidate merchants may be compared, with the best scoring one or more merchants being returned as fuzzy search results. Advantageously, the fuzzy search is useful if some of the fields are empty, i.e., merchant identifier, orientation data, or location data. Furthermore, merchant identifiers may be inaccurate or partially inaccurate when extracted via OCR, and thus the fuzzy search helps account for such errors rather than require exact matching. If one or more merchants are found, they may be returned by the merchant identifier module 204, and an empty set is returned otherwise.

In some embodiments, the fuzzy search may include comparisons between the available data and corresponding merchant data stored in a merchant database. For example, the one or more servers may be configured to access merchant location data defining merchant locations, and compare the merchant location data with the location data indicating the consumer device location. In another example, the one or more servers may be configured to access merchant identifier data defining merchant identifiers, and compare the merchant identifiers defined by the merchant identifier data with the merchant identifier extracted from the image. In another example, the one or more servers may be configured to access merchant orientation data defining orientations of cameras associated with image data of the one or more merchants, and compare the orientations of cameras associated with the image data of the one or more merchants with orientation of the camera when the image data was captured by the consumer device.

In some embodiments, the fuzzy search may require that one or more of the parameters are available. For example, the location data may be required, while a merchant identifier and/or orientation data may be optional.

At 416, the one or more servers may be configured to determine whether multiple merchants were determined from the fuzzy search. Here, the edit scores or other metric by which merchants are matched with the available input data may be used to select one or more merchants. Where two (e.g., highest scoring) merchants have the same or similar (e.g., within a predefined threshold) scores, multiple merchants may be determined from the fuzzy search. Alternatively, where a single merchant scores higher (e.g., above a predefined threshold) than other merchants, the single merchant may be determined from the fuzzy search.

In response to determining that multiple merchants were determined from the fuzzy search, method 400 may proceed to 418, where the one or more servers may be configured to send an indication of the multiple merchants to the consumer device. For example, the indication may be presented via the consumer interface configured to receive consumer device inputs for selection of a merchant the multiple merchants indicated within the user interface.

At 420, the one or more servers may be configured to receive a selection of a first merchant of the multiple merchants from the consumer device. The selection may be generated by the consumer device, such as by receiving a touch screen input or other consumer device input.

At 422, the one or more servers may be configured to associate the first merchant with the location data and the available ones of the merchant identifier and the orientation data for subsequent fuzzy searches. For example, the merchant identifier may be the merchant name as it was recognized from the image data and extracted via OCR. As such, even if the merchant identifier as recognized by the OCR is different from the actual merchant name (e.g., "Taco Hut" recognized as "Taco Hat" because of font, graphics, environmental obstructions, etc.), the merchant identifier as recognized by the OCR may also be associated with first merchant. Similarly, the location data and orientation data may be combined with the merchant identifier as recognized by the OCR to construct an example merchant identifier for an image captured at the particular location pointed in the particular direction. In that sense, the merchant identifier 204 is able to leverage machine learning techniques that use real-time examples as training sets for improving programmatic location determination accuracy. Furthermore, finer grain location determination is possible when image data, location data, and orientation data are used in combination (e.g., at a mall where many stores are closely spaced relative to GPS resolution).

At 424, the one or more servers may be configured to determine the first merchant as a selected merchant. The selected merchant, as used herein, refers to the merchant that the consumer has selected by being located within the vicinity of the merchant, and by taking a picture of the merchant sign, logo, structure, etc. Where multiple candidate merchants are determined by the fuzzy search, the selected merchant refers to the merchant selected by the consumer from the multiple candidate merchants.

Returning to 416, in response to determining that only a single merchant was determined from the fuzzy search, method 400 may proceed to 426, where the one or more servers may be configured to determine the only merchant received from the fuzzy search as the selected merchant. Method 400 may then proceed to 426 and end.

FIG. 5 shows an example of a method 500 of providing an electronic marketing communication based on a selected merchant in accordance with some embodiments. Method 500 may begin at 502 and proceed to 504, where the one or more servers may be configured to determine a selected merchant as discussed in method 300. However, in some embodiments, other techniques for determining a selected merchant may additionally or alternatively be used.

At 506, the one or more servers may be configured to determine whether the selected merchant is associated with an available promotion. For example, promotion data defining available promotions of each merchant may be stored in the one or more databases 106 of the promotion and marketing system 102. Based on the selected merchant, the one or more servers may be configured to query the database 106 for the available promotions.

Where more than a single available promotion of the selected merchant is available, the available promotions and/or items may be scored and/or ranked by a universal relevance service provided by the promotion and marketing system 102 (e.g., the one or more servers 104). For example, the universal relevance service may receive the selected merchant, and may be configured to filter the available promotions accordingly. The universal relevance service may be further configured to score the filtered available promotions for relevance to the consumer. Here, the consumer device may be associated with a consumer account that is managed by the system 102. The system 102 may receive electronic marketing information from various networked devices (e.g., clickstream data and discretionary data from consumer devices, transaction data from merchant devices that interact with consumer devices, etc.) in the course of providing the promotion and marketing service, and may use the electronic marketing information to build a profile. Based on the profile and promotion parameters, the available promotions may then be scored and/or ranked. Additional details regarding a universal relevance service, applicable in some embodiments, are discussed in U.S. Provisional Patent Application No. 62/140,957, titled "Universal Relevance Service Framework," filed Mar. 31, 2015, which is incorporated by reference herein in its entirety.

In response to determining that the selected merchant is associated with an available promotion, method 500 may proceed to 508, where the one or more servers may be configured to generate an electronic marketing communication including an indication of the available promotion. The electronic marketing communication may include an email, application alert, mobile notification, short messenger service (SMS) text, or any other suitable communication channel. The electronic marketing communication may include promotion data defining the promotion, such as a description of the underlying item, and image, video or other media associated with the underlying, promotion parameters such as promotional value, accepted value, etc. The electronic marketing communication may further include a consumer interface configured to allow the consumer to purchase or otherwise accept a promotion, which may result in a redemption instrument being issued to the consumer device.

Returning to 506, in response to determining that the selected merchant fails to be associated with an available promotion, method 500 may proceed to 510, where the one or more servers (e.g., merchant recommender 206) may be configured to determine merchant parameters associated with the selected merchant. Here, the system may facilitate searching for recommendations for similar merchants or promotions that are nearby the consumer device location. Merchant parameters may include characteristics of features of the merchant, such as category (e.g., restaurant, hotel, spa, etc.), subcategory (e.g., Italian restaurant, Chinese restaurant, etc.), price range, location, etc.

At 512, the one or more servers may be configured to determine, based on the merchant parameters and promotion parameters of candidate promotions, one or more promotions associated with merchants different from the selected merchant. For example, the merchant parameters may be used to determine a matching merchant, and then available promotions of the matching merchant may be scored as discussed above to determine a selected promotion.

At 514, the one or more servers may be configured to generate an electronic marketing communication including an indication of at least one of the one or more promotions. FIG. 8 shows an example of an electronic marketing communication 800 in accordance with some embodiments. Electronic marketing communication 800 may be provided to the consumer interface when the selected merchant is determined to not include an available promotion. As such, electronic marketing communication may include selected merchant indication 802 and promotion indication 804. The selected merchant indication 802 may include the name and other information associated with the selected merchant, and may further include a message 806 indicating there are no available promotions associated with the merchant. Promotion indication 804 may include an indication of one or more promotions that are determined to be related to the selected merchant.

At 516, the one or more servers may be configured to provide the electronic marketing communication to the consumer device. For example, the electronic marketing information may be provided to the consumer device via the network 112. Method 500 may then proceed to 518 and end.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus configured to update a machine learning model training data set, the apparatus comprising at least a processor, and a memory associated with the processor having computer coded instructions therein, with the computer coded instructions configured to, when executed by the processor, cause the apparatus to:
   receive, from a consumer device via a network, location data indicating a consumer device location of the consumer device;
   receive, from the consumer device via the network, image data captured by a camera of the consumer device;
   extract a merchant identifier from the image data based on programmatically processing the image data;
   determine a candidate merchant set based on a fuzzy search of the location data and the merchant identifier by comparing first orientation data defining an orientation of the camera when the image data was captured with second orientation data defining an orientation of second image data captured by one or more other cameras;
   send an indication of the candidate merchant set to the consumer device via the network;
   receive a selection of a first merchant profile of the candidate merchant set from the consumer device;
   determine the first merchant as a selected merchant;
   subsequent to determining the first merchant as the selected merchant, associate the first merchant profile with the location data and the merchant identifier for one or more subsequent fuzzy searches by:
   comparing the merchant identifier with actual merchant information associated with the first merchant profile,
   based on the comparing, determining that the merchant identifier is different from actual merchant information associated with the first merchant profile,
   associating the merchant identifier with the first merchant profile,
   associating the location data with the first merchant profile, and
   programmatically updating, based at least in part on the merchant identifier, the machine learning model training data set.

2. The apparatus of claim 1, wherein the computer coded instructions are further configured to, when executed by the processor, cause the apparatus to utilize the machine learning model training data set for improving programmatic location determination accuracy.

3. The apparatus of claim 1, wherein the merchant identifier is one or more of a merchant sign, a merchant logo, a merchant menu, a merchant interior structure, or a merchant storefront structure.

4. The apparatus of claim 1, wherein the computer coded instructions are further configured to, when executed by the processor, cause the apparatus to extract the merchant identifier from the image data based on programmatically processing the image data by:
  extracting an object from the image data; and
  determining the merchant identifier based on the object.

5. The apparatus of claim 1, wherein the computer coded instructions are further configured to, when executed by the processor, cause the apparatus to:
  subsequent to determining the first merchant as the selected merchant:
    determine, based on accessing promotion data associated with the selected merchant, whether the selected merchant is associated with an available promotion; and
    in response to determining that the selected merchant fails to be associated with an available promotion:
      determine merchant parameters associated with the selected merchant;
      determine, based on the merchant parameters and promotion parameters defining candidate promotions, one or more promotions associated with merchants that are different from the selected merchant and related to the selected merchant; and
      generate an electronic marketing communication including an indication of at least one of the one or more promotions.

6. The apparatus of claim 1, wherein the computer coded instructions are further configured to, when executed by the processor, cause the apparatus to determine the candidate merchant set based on the fuzzy search of the location data and the merchant identifier by:
  accessing merchant identifier data defining merchant identifiers; and
  comparing the merchant identifiers defined by the merchant identifier data with the merchant identifier extracted from the image data.

7. A method for updating a machine learning model training data set, the method comprising:
  receiving, by one or more servers and from a consumer device via a network, location data indicating a consumer device location of the consumer device;
  receiving, from the consumer device via the network, image data captured by a camera of the consumer device;
  extracting a merchant identifier from the image data based on programmatically processing the image data;
  determining a candidate merchant set based on a fuzzy search of the location data and the merchant identifier by comparing first orientation data defining an orientation of the camera when the image data was captured with second orientation data defining an orientation of second image data captured by one or more other cameras;
  sending an indication of the candidate merchant set to the consumer device via the network;
  receiving a selection of a first merchant of the candidate merchant set from the consumer device;
  determining the first merchant as a selected merchant;
  subsequent to determining the first merchant as the selected merchant, associating the first merchant profile with the location data and the merchant identifier for one or more subsequent fuzzy searches by:
    comparing the merchant identifier with an actual merchant name associated with the first merchant profile,
    based on the comparing, determining that the merchant identifier is different from the actual merchant name associated with the first merchant profile,
    associating the merchant identifier with the first merchant profile,
    associating the location data with the first merchant profile, and
    programmatically updating, based at least in part on the merchant identifier, the machine learning model training data set.

8. The method of claim 7, further comprising utilizing the machine learning model training data set for improving programmatic location determination accuracy.

9. The method of claim 7, wherein the merchant identifier is one or more of a merchant sign, a merchant logo, a merchant menu, a merchant interior structure, or a merchant storefront structure.

10. The method of claim 7, wherein the extracting the merchant identifier from the image based on programmatically processing the image data comprises:
  extracting an object from the image data; and
  determining the merchant identifier based on the object.

11. The method of claim 7, further comprising:
  subsequent to determining the first merchant as the selected merchant:
    determining, based on accessing promotion data associated with the selected merchant, whether the selected merchant is associated with an available promotion; and
    in response to determining that the selected merchant fails to be associated with an available promotion:
      determining merchant parameters associated with the selected merchant;
      determining, based on the merchant parameters and promotion parameters defining candidate promotions, one or more promotions associated with merchants that are different from the selected merchant and related to the selected merchant; and
      generating an electronic marketing communication including an indication of at least one of the one or more promotions.

12. The method of claim 7, wherein the one or more servers configured to determine the candidate merchant set based on the fuzzy search of the location data and the merchant identifier by:
  accessing merchant identifier data defining merchant identifiers; and
  comparing the merchant identifiers defined by the merchant identifier data with the merchant identifier extracted from the image.

* * * * *